(12) United States Patent
Kane

(10) Patent No.: US 7,717,333 B2
(45) Date of Patent: May 18, 2010

(54) METHOD AND MEANS FOR REGISTERING A DEBIT CARD

(76) Inventor: Larry J. Kane, 701 Tama St., Marion, IA (US) 52302

( * ) Notice: Subject to any disclaimer, the term of this patent is extended or adjusted under 35 U.S.C. 154(b) by 1048 days.

(21) Appl. No.: 11/307,645

(22) Filed: Feb. 15, 2006

(65) Prior Publication Data

US 2007/0203715 A1 Aug. 30, 2007

(51) Int. Cl.
*G06K 5/00* (2006.01)
(52) U.S. Cl. .................. 235/380; 235/379; 235/449; 235/454
(58) Field of Classification Search ........... 235/379, 235/380; 283/58
See application file for complete search history.

(56) References Cited

U.S. PATENT DOCUMENTS

| | | | | |
|---|---|---|---|---|
| 3,640,008 | A | * | 2/1972 | Crail ..................... 40/638 |
| 4,109,238 | A | | 8/1978 | Creekmore |
| 4,187,498 | A | | 2/1980 | Creekmore |
| 4,321,672 | A | | 3/1982 | Braun et al. |
| 4,617,457 | A | * | 10/1986 | Granzow et al. ........... 235/379 |
| 4,672,377 | A | | 6/1987 | Murphy et al. |
| 4,816,655 | A | | 3/1989 | Musyck et al. |
| 4,958,066 | A | | 9/1990 | Hedgcoth |
| 5,053,607 | A | | 10/1991 | Carlson et al. |
| 5,119,293 | A | | 6/1992 | Hammond |
| 5,267,149 | A | | 11/1993 | Anada et al. |
| 5,341,428 | A | | 8/1994 | Schatz |
| 5,426,281 | A | | 6/1995 | Abecassis |
| 5,444,616 | A | | 8/1995 | Nair et al. |
| 5,531,482 | A | * | 7/1996 | Blank ..................... 283/67 |
| 5,570,960 | A | | 11/1996 | Smith |
| 5,667,315 | A | | 9/1997 | Smith |
| 5,678,937 | A | | 10/1997 | Smith |
| 5,754,653 | A | | 5/1998 | Canfeld |
| 5,925,865 | A | | 7/1999 | Steger |
| 6,010,159 | A | * | 1/2000 | Warther ................... 283/61 |
| 6,073,121 | A | | 6/2000 | Ramzy |
| 6,193,155 | B1 | | 2/2001 | Walker et al. |
| 6,270,012 | B1 | * | 8/2001 | Dawson ................... 235/381 |
| 6,282,523 | B1 | | 8/2001 | Tedesco et al. |
| 6,321,201 | B1 | | 11/2001 | Dahl |
| 6,390,362 | B1 | | 5/2002 | Martin |
| 6,588,658 | B1 | * | 7/2003 | Blank ..................... 235/380 |
| 6,592,029 | B2 | | 7/2003 | Brikho |
| 6,644,546 | B2 | | 11/2003 | George et al. |
| 6,728,397 | B2 | | 4/2004 | McNeal |
| 6,938,821 | B2 | | 9/2005 | Gangi |

(Continued)

*Primary Examiner*—Daniel A Hess
*Assistant Examiner*—Michael Andler

(57) ABSTRACT

A method and means of registering for a debit card includes a card having an account number that is the same as an account number encoded on a magnetic strip of the card. Removably attached to the card is a first and a second label. The first label has the account number printed thereon and a designated area where customer information is filled in. The second label has an authorization code such as a PIN number printed thereon. Both the account number and PIN number are stored in a database maintained by a service provider. To register, the first label is removed from the card and attached to a customer's check and the second label is removed and retained by the customer. The check is scanned and transmitted to the service provider. The service provider compares the account number on the first label of the scanned check with the stored PIN number and creates a debit card account for the customer associated with the customer's checking account.

12 Claims, 4 Drawing Sheets

U.S. PATENT DOCUMENTS

| | | | |
|---|---|---|---|
| 7,104,443 B1 * | 9/2006 | Paul et al. | 235/380 |
| 7,445,147 B2 * | 11/2008 | Hein | 235/380 |
| 2002/0091635 A1 | 7/2002 | Dilip et al. | |
| 2002/0120582 A1 * | 8/2002 | Elston et al. | 705/64 |
| 2002/0138351 A1 | 9/2002 | Houveneer et al. | |
| 2003/0036918 A1 | 2/2003 | Pintsov | |
| 2003/0200166 A1 * | 10/2003 | Schaub | 705/36 |
| 2003/0236728 A1 | 12/2003 | Sunderji et al. | |
| 2005/0045715 A1 * | 3/2005 | Lombardino | 235/380 |

* cited by examiner

METHOD AND MEANS FOR REGISTERING A DEBIT CARD

BACKGROUND OF THE INVENTION

This invention is directed toward a method and means of registering for a debit card. For a retailer, particularly a high volume retailer such as a grocery store, use of a debit card when making a purchase is the least expensive manner of making a purchase, and the least time consuming. The registration process for a debit card, however, is time consuming and inconvenient for many consumers. A merchant may send direct mail pieces to consumers, but these mail pieces have a low conversion rate. Alternatively, a customer is directed to a customer service area where an application is filled out and processed before a card is issued.

Because of the inconvenience of these conventional registration methods, there exists a need in the art for a method and a means that addresses these shortcomings.

Therefore, an object of the present invention is to provide a method of registering for a debit card that is easy and not time consuming.

Another object of the present invention is to provide a debit card that facilitates the ease of registration.

These and other objectives will be apparent to those skilled in the art based on the following written description.

SUMMARY OF THE INVENTION

A method and means of registering for a debit card includes a card having an account number that is the same as an account number encoded on a magnetic strip of the card. Removably attached to the card is a first and a second label. The first label has the account number printed thereon and a designated area where customer information is filled in. The second label has an authorization code such as a PIN number printed thereon. Both the account number and PIN number are stored in a database maintained by a service provider.

To register, the first label is removed from the card and attached to a customer's check and the second label is later removed and retained by the customer, after he memorizes the number on the label. The check is scanned and transmitted to the service provider. The service provider compares the account number on the first label of the scanned check with the stored PIN number and creates a debit card account for the customer associated with the customer's checking account.

DETAILED DESCRIPTION OF THE PREFERRED EMBODIMENT

Figure 1:
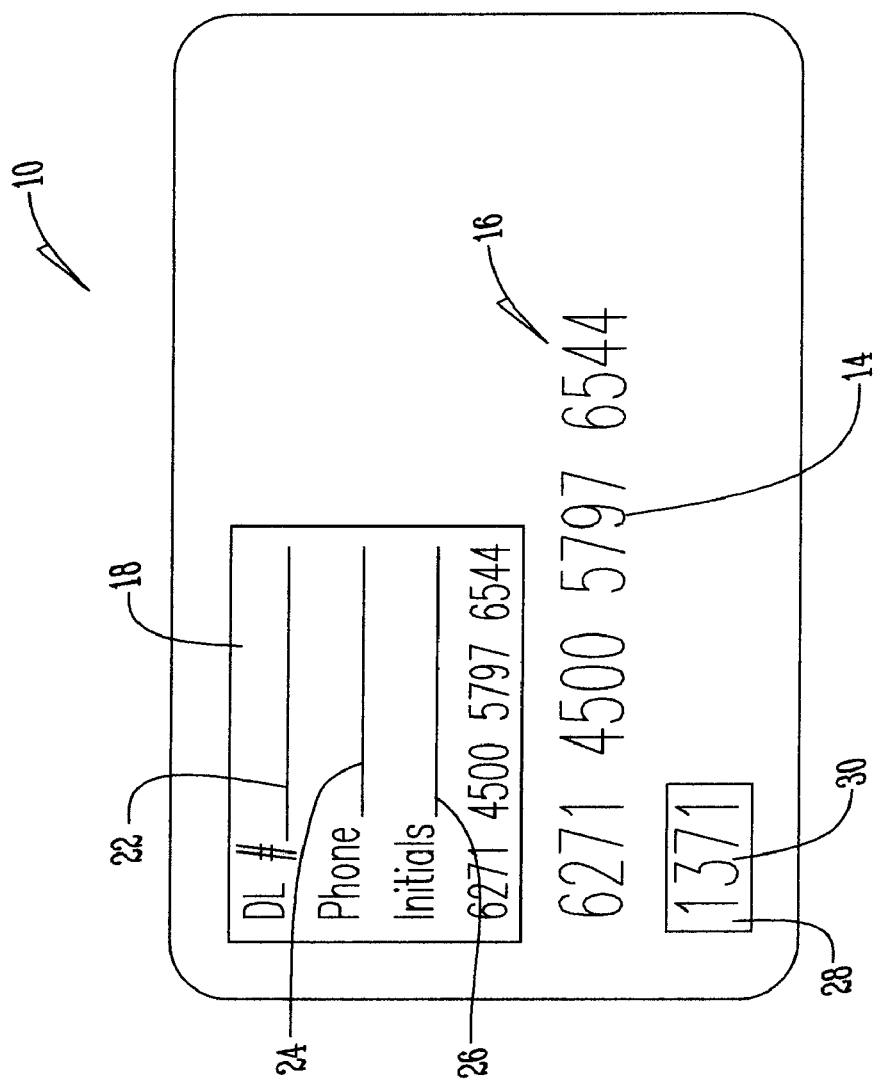
FIG. 1 is a plan view of a debit card.
Figure 2:
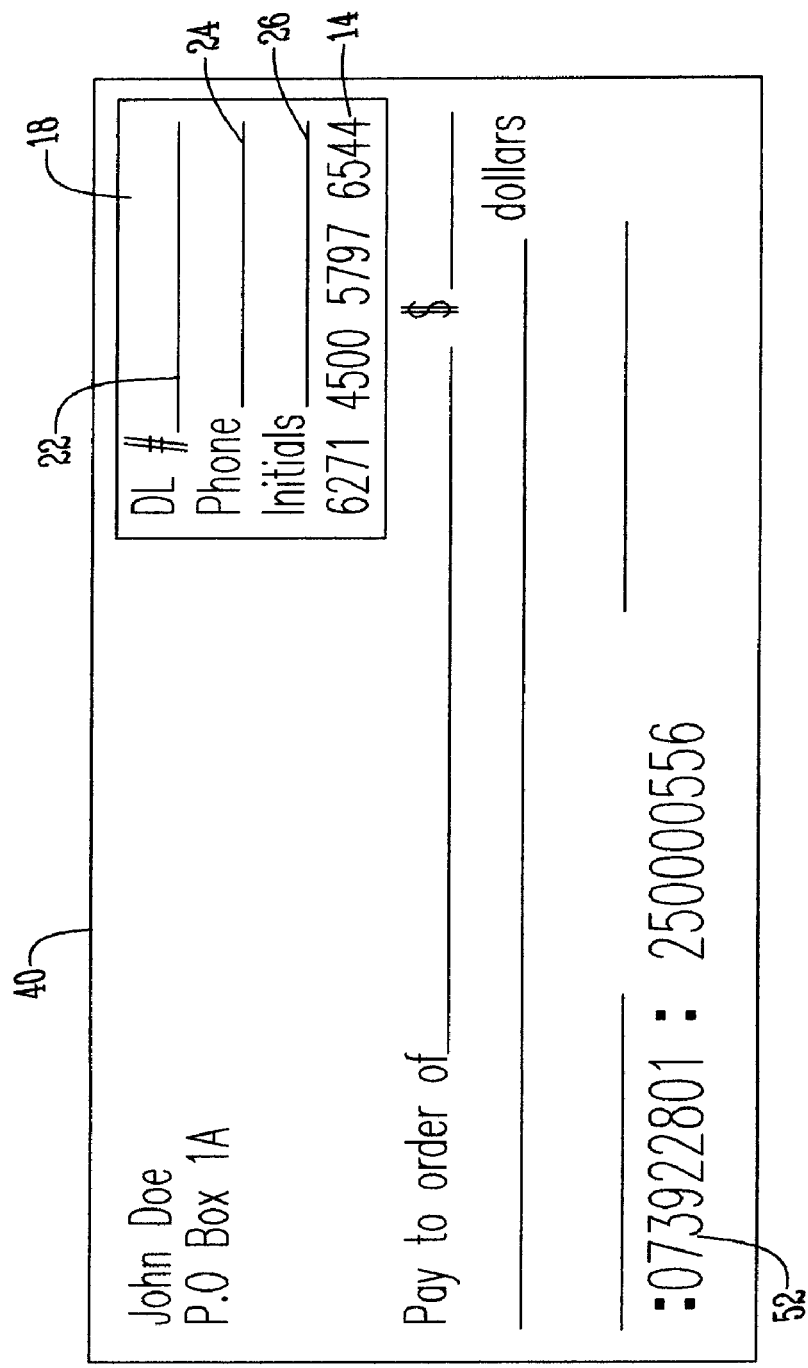
FIG. 2 is a plan view of a check with a label.
Figure 3:
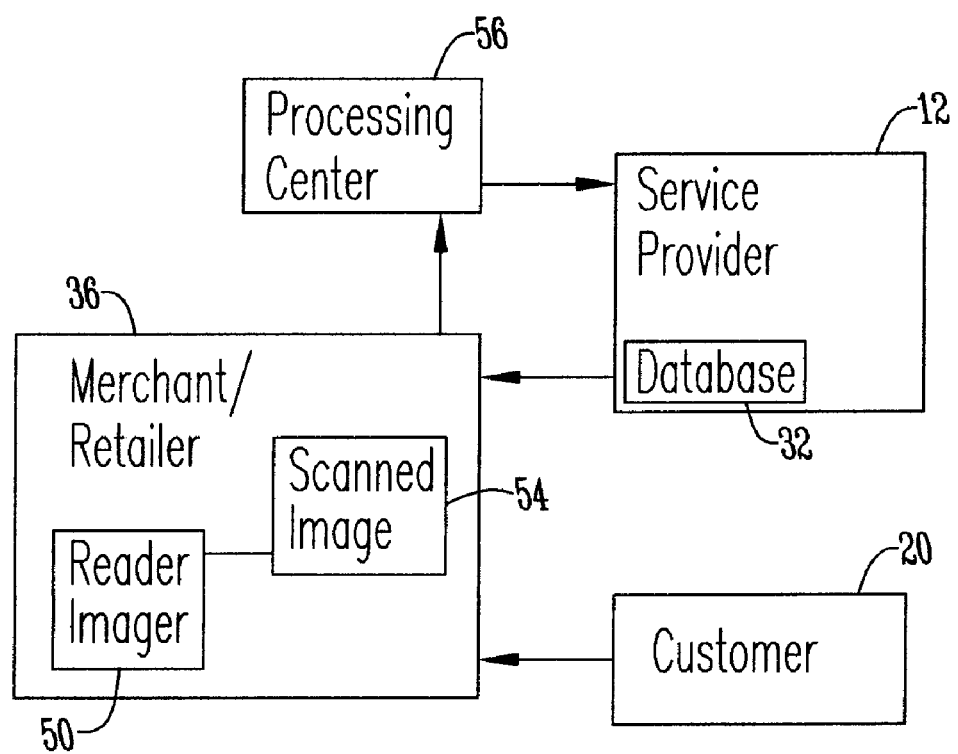
FIG. 3 is a schematic depicting the environment in which the debit card is used.
Figure 4:
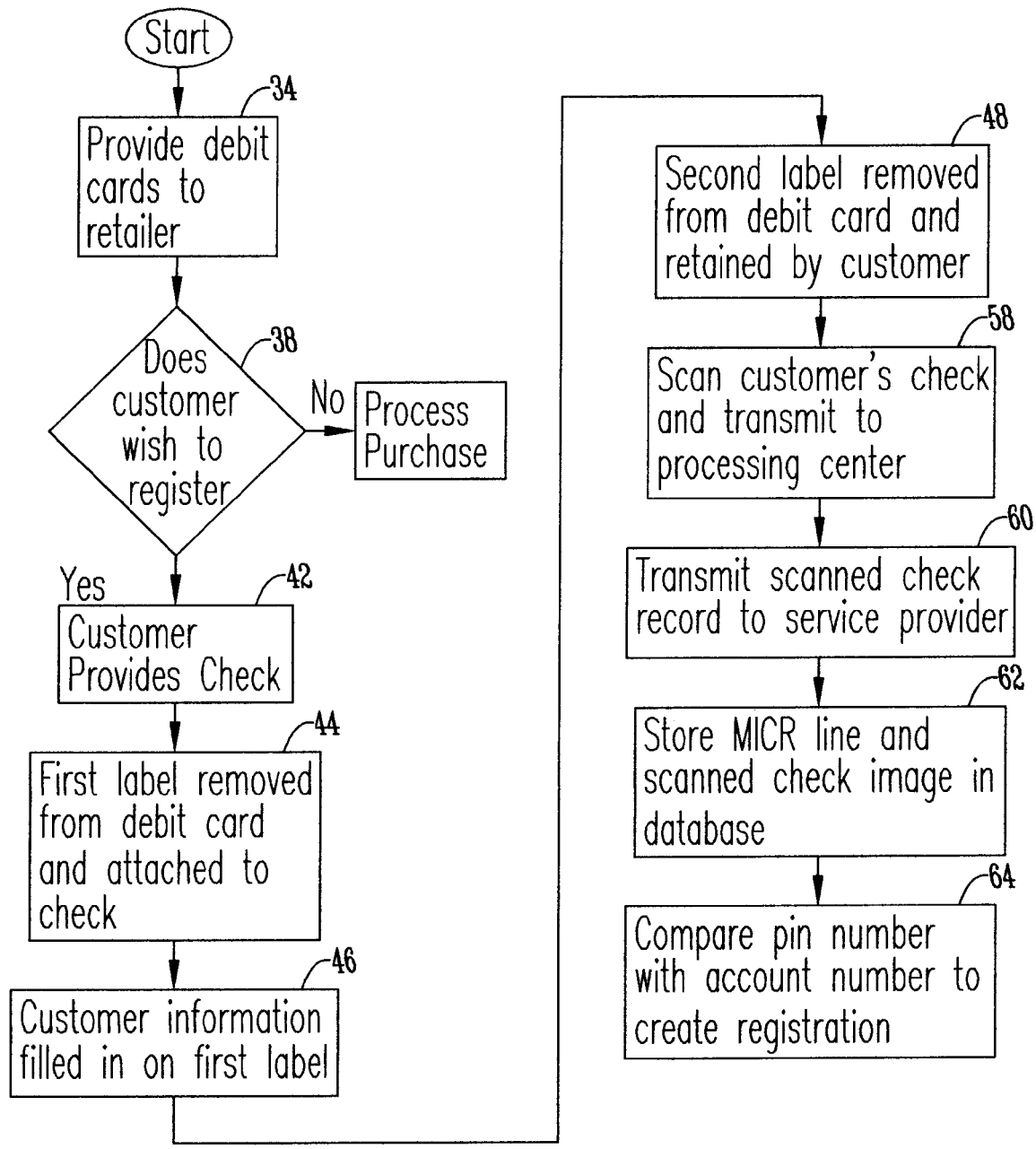
FIG. 4 is a flow chart of a method of registering for a debit card.

Referring to the Figures a debit card 10 is provided by a service provider 12. The debit card 10 has an account number 14 that is the same as an account number encoded on the magnetic strip 16 of the debit card 10. Removably attached to the debit card 10 are two labels. The first label 18 has the debit card account number 14 printed thereon. The first label 18 also has designated areas where a customer 20 supplies personal information such as a driver's license number 22, a phone number 24, and their initials 26. Preferably, the first label 18 has a removable adhesive on a back surface that is attached to the debit card 20.

The second label 28 has a PIN number 30, or some other authorization number or code printed on the label 28. The PIN number 30 is not encoded on the magnetic strip 16, but rather is stored in a database 32, along with the debit card account number 14, and maintained by the service provider 12. The second label 18 has an adhesive material on a back surface and is removably attached to the debit card 10. Alternatively, the second label 28 is a breakaway tab attached to the debit card 10.

The method of registering the debit card 10 begins at step 34 where the service provider 12 supplies a plurality of debit cards 10 to a merchant/retailer 36. When a customer 20 makes a purchase from the retailer 36, at step 38, the customer is offered an opportunity to register for a debit card 10. If the customer declines the opportunity to register, they proceed with the purchase through a conventional system utilizing a check, cash, or credit card. If the customer 20 accepts the opportunity to register then the customer provides a check 40 from the customer's checking account at step 42, and fills the check out for the purchase.

At step 44, the merchant/retailer 36 selects a debit card 10, removes the first label 18, and places the first label 18 on the check 40 where it is adhesively secured. The customer 20 at step 46, fills in the personal information in the designated areas such as the driver's license number 22, the phone number 24, and the customer's initials 26. At step 48, the customer removes the second label 28 having the PIN number 30 and retains the label 28 for use with future transactions.

Next, using a conventional check reader and imager 50, the check is scanned and the MICR line 52 and image 54 of both the front and back of the check 40 are stored and then transmitted over a secure electronic network to a processing center 56 at step 58. At the processing center 56, an ACH file is created and forwarded to the checking account financial institution where the account will be debited. The processing center 56 also transmits over a secure electronic network the recorded MICR line 52 and scanned image 54 to the service provider 12 at step 60.

Once received, at step 62 the service provider 12 stores the MICR line record 52 and scanned image 54 in its database 32. Once stored, at step 64, the personal information 22, 24, and 26, and the debit card account number 14 are taken from the scanned image 54 and compared with the stored PIN number 30 to create a debit card registration that is associated with the MICR line 52 on the check 40 for the customer 20. Once registered, the customer 20, by using the PIN number 30 will be able to debit funds from the associated checking account using the debit card.

Therefore, a method and means for registering a debit card has been shown that at the least meets the stated objectives.

What is claimed is:

1. A debit card, comprising:
   a card having an account number that is the same as an encoded account number on a magnetic strip and is positioned on a surface of a card;
   a first label removably attached to the surface of the card and having the account number printed on the first label and designated areas for a customer to supply personal information; and
   a second label removably attached to the card having an authorization code printed on the second label and not encoded on the card.

2. The debit card of claim 1 wherein the designated area is selected from the group consisting of driver's license number, phone number, and initials.

3. The debit card of claim 1 wherein the authorization code is a PIN number.

4. The debit card of claim 1 wherein the first label and the second label are positioned on the surface of the card.

5. The debit card of claim 1 wherein the first label is attached to the debit card by way of a removable adhesive.

6. The debit card of claim 1 wherein the second label is attached to the debit card by way of a removable adhesive.

7. The debit card of claim 1 wherein the authorization code is stored in a database along with the account number and maintained by a service provider.

8. A method of registering for a debit card, the method comprising the steps of:

printing account number information associated with the debit card on a first label;

providing at least one debit card having the first label and a second label removably attached to the card;

removing the first label and adhering the first label to a surface of the check;

removing the second label for retention by a customer;

scanning the check with the first label to record MICR line information and labeled check information;

transmitting the recorded check information to a service provider; and comparing the recorded first label information with stored information associated with the second label to create a debit card registration for the debit card associated with the MICR line of the check.

9. The method of claim 8 further comprising the step of adding personal identification information on the first label.

10. The method of claim 8 further comprising the step of printing an authorization code on the second label.

11. The method of claim 8 further comprising the step of assigning an account number and an authorization code to the debit card.

12. The method of claim 11 wherein the account number and authorization code are stored in a database.

\* \* \* \* \*